United States Patent
Bai

(10) Patent No.: US 9,728,812 B2
(45) Date of Patent: Aug. 8, 2017

(54) ELECTROSTATIC ENERGY STORAGE DEVICE AND PREPARATION METHOD THEREOF

(71) Applicants: Jin Bai, Zhengzhou, Henan (CN); Gang Feng, Zhengzhou, Henan (CN)

(72) Inventor: Jin Bai, Henan (CN)

(73) Assignees: Jin Bai, Zhengzhou, Henan (CN); Gang Feng, Zhengzhou, Henan (CN)

( * ) Notice: Subject to any disclaimer, the term of this patent is extended or adjusted under 35 U.S.C. 154(b) by 681 days.

(21) Appl. No.: 14/103,281

(22) Filed: Dec. 11, 2013

(65) Prior Publication Data

US 2014/0185187 A1   Jul. 3, 2014

(30) Foreign Application Priority Data

Dec. 28, 2012 (CN) .......................... 2012 1 0581088

(51) Int. Cl.
| | |
|---|---|
| H01G 4/06 | (2006.01) |
| H01G 4/20 | (2006.01) |
| H01G 4/008 | (2006.01) |
| H01M 10/0585 | (2010.01) |
| H01G 4/12 | (2006.01) |
| H01G 4/30 | (2006.01) |
| H01G 4/33 | (2006.01) |
| H01M 10/0525 | (2010.01) |

(52) U.S. Cl.
CPC ........ *H01M 10/0585* (2013.01); *H01G 4/008* (2013.01); *H01G 4/1209* (2013.01); *H01G 4/30* (2013.01); *H01G 4/33* (2013.01); *H01M 10/0525* (2013.01); *Y10T 29/417* (2015.01)

(58) Field of Classification Search
CPC ....... H01G 4/008; H01G 4/1209; H01L 28/40
USPC .................. 361/312, 321.1, 305, 321.2, 313
See application file for complete search history.

(56) References Cited

U.S. PATENT DOCUMENTS

| | | | |
|---|---|---|---|
| 5,587,870 A * | 12/1996 | Anderson | H01G 4/20 257/E21.008 |
| 2006/0176350 A1* | 8/2006 | Howarth | B41J 2/01 347/102 |

* cited by examiner

*Primary Examiner* — Eric Thomas
*Assistant Examiner* — Arun Ramaswamy
(74) *Attorney, Agent, or Firm* — Locke Lord LLP; Tim Tingkang Xia, Esq.

(57) ABSTRACT

The present invention discloses an electrostatic energy storage device and a preparation method thereof. The device comprises at least one electrostatic energy storage unit, wherein each electrostatic energy storage unit is provided with a five-layer structure and comprises two metal film electrodes which form a capacitor, composite nano insulating film layers attached to the inner sides of the two metal film electrodes, and a ceramic nano crystalline film arranged between the composite nano insulating film layers. Based on the electrostatic parallel-plate induction capacitor principle, the metal film electrodes with a nano microstructure and the ceramic nano crystalline film sandwiched between the metal film electrodes and having an ultrahigh dielectric constant form an electrostatic induction plate capacitor to store electrostatic energy.

8 Claims, 3 Drawing Sheets

ELECTROSTATIC ENERGY STORAGE DEVICE AND PREPARATION METHOD THEREOF

CROSS-REFERENCE TO RELATED APPLICATIONS

This non-provisional application claims priority under 35 U.S.C. §119(a) on Patent Application No. 201210581088.1, filed in P.R. China on Dec. 28, 2012, the entire contents of which are hereby incorporated by reference.

TECHNICAL FIELD

The present invention relates to an energy storage device, in particular to an ultrathin electrostatic energy storage device with high energy density and high power density, and a preparation method thereof.

BACKGROUND

At present, the commonly-used energy storage device is lithium ion battery, which is featured by a carbon material-made cathode and a lithium-containing compound-made anode. When this lithium ion battery is under charging, its anode material generates lithium ions that move to the cathode through electrolyte. Carbon serving as the cathode is of a layered structure with a large number of micropores therein, so those lithium ions that reach the cathode are embedded into the micropores of the carbon layer. The more the lithium ions are embedded, the higher the charging capacity will be; when the lithium ion battery is under discharging, the lithium ions embedded in the cathode carbon layer move out and then back to the anode. The more the lithium ions move back to the anode, the higher the discharging capacity will be. While performance, safety and other factors of the lithium ion battery have been dramatically improved after constant improvement on the lithium ion battery in this industry, there are still a few major shortcomings in the lithium ion battery owing to limitations from its basic structure and charging/discharging principle:

1. Small Power Density of the Lithium Ions. Limited by the electrode energy storage principle and electrolyte structure of the lithium ion battery, the lithium ion battery only has a power density of 1 kw/kg, which places restrictions on application of the lithium ion battery in the aspect of power battery.

2. Small Energy Density of the Lithium Ions. The lithium ion battery has an energy density of 120-160 Wh/kg, and this cannot completely meet the demand in power applications, such as electric vehicle.

3. Long Charging Time. The lithium ion battery needs to be charged for over 2-4 hours in case of a charging current of 0.5 C-1 C. In case of a high current of more than 2 C, the charging time can be reduced, but this high current could separate out hydrogen and oxygen from the electrolyte of the lithium ion battery, and simultaneously, high temperature is created to result in the hidden safety trouble of explosion of the lithium ions. Meanwhile, this high current will cause damage to the microstructures of the anode and cathode of the lithium ion battery, which reduces the energy storage capacity and shortens the service life to a large extent.

4. Short Cycle Life. In the event of deep discharging, the charging/discharging cycle life of the lithium ion battery is approximately from 300 times to 500 times, leading to short service life.

5. Limited Service Temperature Range. The service temperature range of the lithium ion battery is from minus 20° C. to 60° C., use of the lithium ion battery at a temperature higher than the temperature range reduces energy efficiency, causes damage to the battery and possibly leads to explosion. And use of the lithium ion battery at a temperature lower than the temperature range reduces the efficiency and energy storage capacity of the battery significantly.

Thus, a technical problem that needs to be solved urgently in this industry is how to provide a novel electrostatic energy storage device with high energy density and high power density, and a preparation method thereof.

SUMMARY OF THE INVENTION

To solve the shortcomings of small energy and power densities and short service life in the current lithium battery, provided in the present invention are a novel full-solid electrostatic energy storage device and a preparation method thereof.

The electrostatic energy storage device provided in the present invention comprises at least one electrostatic energy storage unit, wherein the electrostatic energy storage unit comprises two metal film electrodes which form a capacitor, composite nano insulating film layers attached to the inner sides of the two metal film electrodes, and a ceramic nanocrystalline film arranged between the composite nano insulating film layers. The electrostatic energy storage units are connected with each other in parallel through a metal nano powder current collector.

In this technical solution, the metal film electrode is made from one of the group consisting of nickel, copper, zinc, tin, silver and alloy thereof, preferably from nickel; the metal film electrode has a thickness of 1.015 microns, preferably 2.5 microns; the composite nano insulating film layer is made from an organic nano insulating material having a particle size less than 50 nanometers and a breakdown voltage of $10^6$-$10^7$V/cm orders of magnitude, or an inorganic nano insulating material, or an organic/inorganic hybrid nano insulating layer; the composite nano insulating film layer has a thickness of 0.1-0.5 microns, preferably 0.25 microns; the ceramic nanocrystalline film is made from a ferroelectric ceramic nanocrystalline material or a non-ferroelectric ceramic nanocrystalline material, preferably from the non-ferroelectric ceramic nanocrystalline material; and the ceramic nanocrystalline film has a thickness of 1-20 microns, preferably 6.5 microns.

Further provided in the present invention is a preparation method of the electrostatic energy storage device, which comprises the steps:

A. The metal film electrode is prepared by means of vacuum coating or electrochemical deposition, preferably electrochemical deposition;

B. Then, photoetching, or composite nano electrochemical deposition, or vapor deposition is carried out on the metal film electrode to form a nano microstructure on the surface of the metal film electrode;

C. By means of ion sputtering, or electrophoresis, or spin coating, or Czochralski method, or screen printing, or inkjet printing, the composite nano insulating film layer having a high dielectric strength is attached to the metal film electrode, and then, the composite nano insulating film layer at one end of the metal film electrode is removed to expose a conductive surface, thus forming an anode/cathode.

D. A surface-modified nano ceramic nanocrystalline is hot-pressed into the ceramic nanocrystalline film; or a ceramic nanocrystalline precursor is prepared using sol-gel method, the ceramic nanocrystalline precursor is then drawn for film formation, and the film-drawn ceramic nanocrystalline precursor is fired into the ceramic nanocrystalline film, or the film-drawn ceramic nanocrystalline precursor is fired into the ceramic nanocrystalline film by means of laser scanning sintering, afterwards, by means of ion sputtering, or electrophoresis, or spin coating, or Czochralski method, or screen printing, or inkjet printing, the ceramic nanocrystalline film having an ultrahigh dielectric constant is further attached to the metal film electrode to form a three-layer structure of the electrostatic energy storage unit;

E. The prefabricated metal film electrode is formed by repeating the steps A to C and then laid on the three-layer structure formed in the step D, so that the anode and cathode of the electrostatic energy storage unit are located at the two ends, respectively; and F: Nano metal conductive powders are overprinted on the anode and the cathode to form metal nano powder current collectors, the steps A to E are repeated until the electrostatic energy storage units are piled up in parallel to reach a set storage capacity or thickness, and the piled-up electrostatic energy storage units are hot-pressed in a precision parallel-plate vacuum hot-pressing machine to finally form the electrostatic energy storage device.

Based on the electrostatic parallel-plate induction capacitor principle, the metal film electrodes with a nano microstructure, and the ceramic nanocrystalline film sandwiched between the metal film electrodes and having an ultrahigh dielectric constant, together form an electrostatic induction plate capacitor to store electrostatic energy. The full-solid material and the nano microstructures can improve the energy storage capacity and capacitor voltage of the electrostatic energy storage device to acquire high energy density, and meanwhile, there is only a small displacement current inside, the full-solid material is resistant to high temperature and free from the liquid-phase temperature limitation in the prior art, as a result, the electrostatic energy storage device is capable of offering a large power density output and avoids explosion danger. Compared with the prior art, the electrostatic energy storage device in the present invention can be charged at high speed under a 1000V voltage, so the charging time is greatly shortened, and after charging, the device can provide an energy density up to 500 Wh/kg, a power density up to 150 kw/kg and a self-discharge rate smaller than 0.5%/30 days; furthermore, this device will not be damaged even in case of a high instantaneous discharge current, has a relatively wide service temperature range, and can operate normally within a temperature range from minus 70° C. to 200° C.

DETAILED DESCRIPTION OF THE EMBODIMENTS

The electrostatic energy storage device provided in an embodiment of the present invention comprises at least one electrostatic energy storage unit, a ceramic nanocrystalline film having a high dielectric constant as well as ultrathin metal film electrodes having a nanostructure and a large specific surface area are used to form the ultrathin electrostatic energy storage unit, and these electrostatic energy storage units are piled up in parallel to form the full-solid ceramic nanocrystalline electrostatic energy storage device having high energy density and ultrahigh charging/discharging power density.

Figure 1:
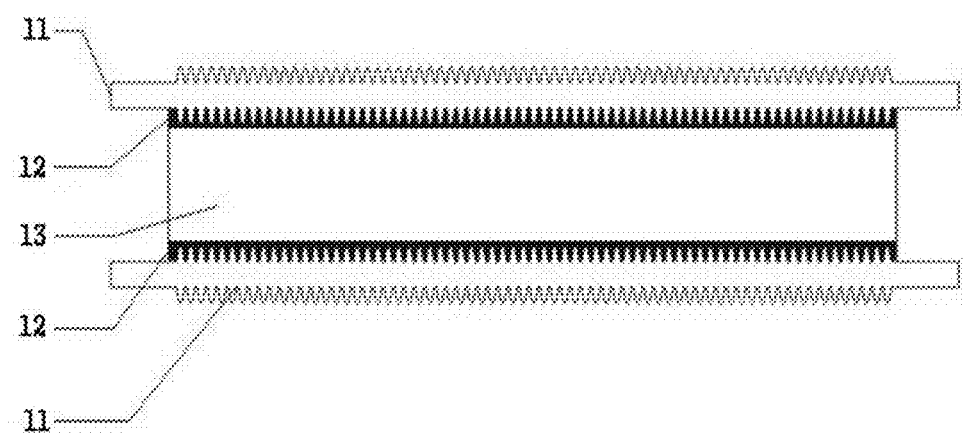
FIG. 1 is a structure view of the electrostatic energy storage unit of the present invention.

As shown in FIG. 1, every electrostatic energy storage unit 1 has a 5-layer structure, wherein the first layer and the fifth layer are metal film electrodes 11 having the nano microstructure, these two metal film electrodes 11 together form a capacitor and may be made either from conductive metal, such as nickel, copper, zinc, tin and silver, or from alloy thereof, preferably from the metal nickel; and the metal film electrode is extremely thin and has a thickness range from 1.0 micro to 15 microns, preferably 2.5 microns.

The second layer and the fourth layer are composite nano insulating film layers 12 attached to the inner sides of the metal film electrodes; the composite nano insulating film layer 12 may be made either from an organic or inorganic nano insulating material having a high dielectric strength, or from an organic/inorganic hybrid nano insulating material; it is required in the composite nano insulating film layer 12 that the particle size is less than 50 nanometers and the breakdown voltage is $10^6$-$10^7$V/cm orders of magnitude; and the composite nano insulating film layer 12 has a thickness of 0.1-0.5 microns, preferably 0.25 microns.

The last layer is the third layer sandwiched between those layers, namely, a ceramic nanocrystalline film 13. This layer is made from a ferroelectric ceramic nanocrystalline material or a non-ferroelectric ceramic nanocrystalline material, preferably from the non-ferroelectric ceramic nanocrystalline material, and has a thickness of 1-20 microns, preferably 6.5 microns.

Figure 2:
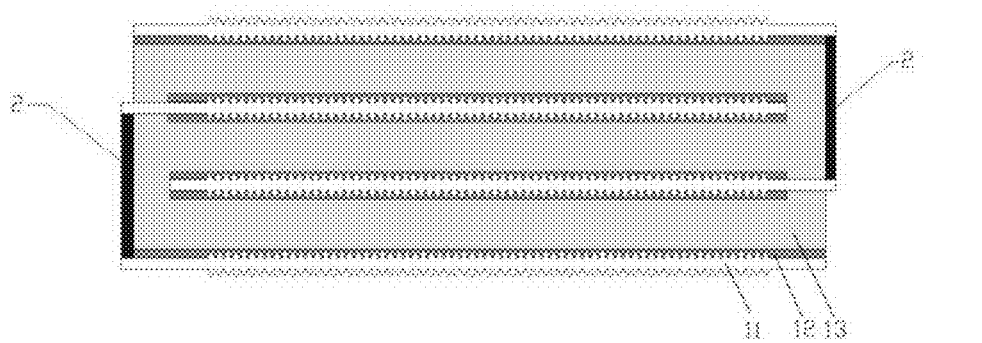
FIG. 2 is a structure view of the electrostatic energy storage device of the present invention.

As shown in FIG. 2, based on practical needs, a plurality of electrostatic energy storage units 1 can be piled up to form an electrostatic energy storage device that has a storage battery capacity conforming to the predetermined design, and these electrostatic energy storage units are connected with each other in parallel through a metal nano powder current collector 2 so as to form such a structure between any two adjacent metal film electrodes that one ceramic nanocrystalline film is sandwiched between two composite nano insulating film layers. In this embodiment, two electrostatic energy storage units are piled up to illustrate the connection relationship of these electrostatic energy storage units, the metal nano powder current collectors are used for connection between the anodes and connection between the cathodes of these two electrostatic energy storage units, composite nano insulating film layers are also attached to the outer sides of the two metal film electrodes adjacent to the two electrostatic energy storage units, and then, a ceramic nanocrystalline film is arranged between the composite nano insulating film layers.

Figure 3:
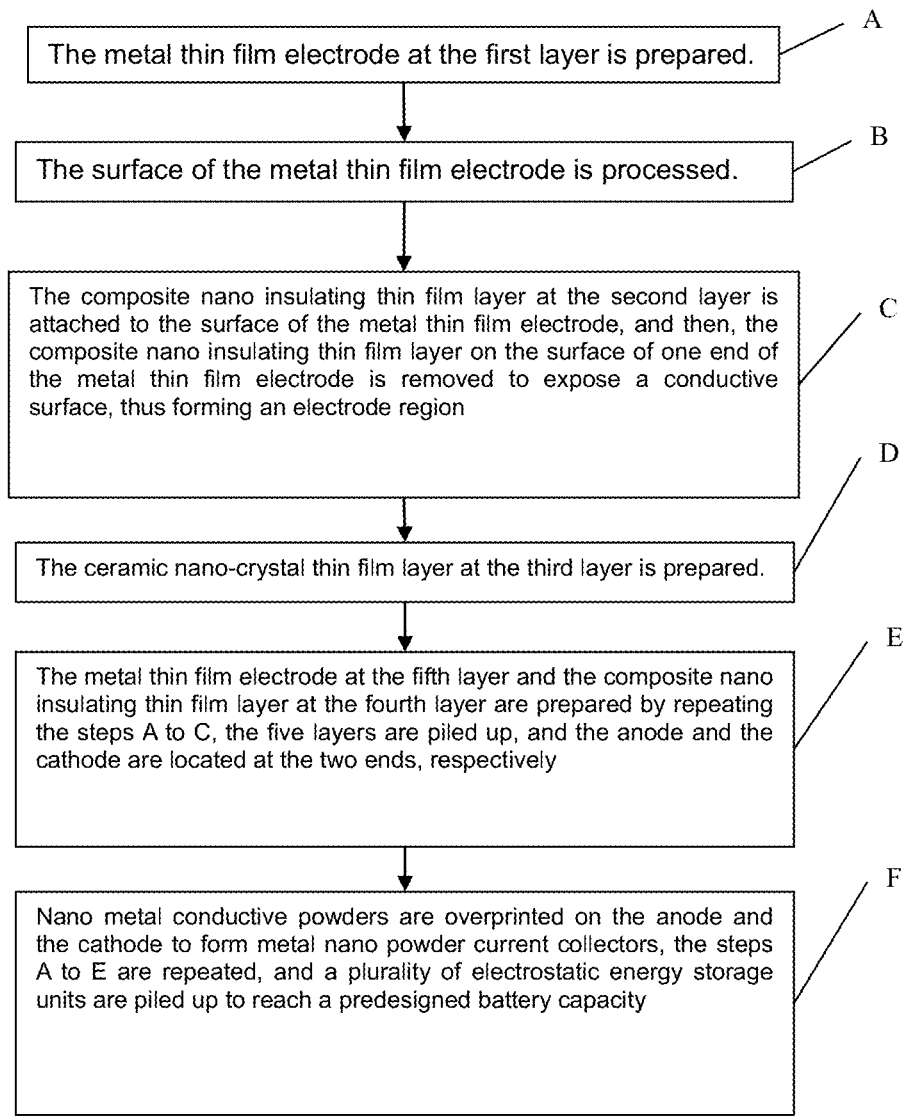
FIG. 3 is a flowchart of the preparation method of the present invention.

As shown in FIG. 3, the preparation method of the electrostatic energy storage device provided in the present invention mainly comprises the steps:

A. At first, the metal film electrode at the first layer is processed; the metal film electrode is prepared mainly by means of two methods, i.e. vacuum coating and electrochemical deposition, wherein the preferable one is electrochemical deposition;

B. Then, photoetching, or composite nano electrochemical deposition, or vapor deposition is carried out on the surface of the metal film electrode to form a nano microstructure on the surface of the metal film electrode, in order to increase the surface area of the metal film electrode;

C. After the metal film electrode at the first layer is properly processed, by means of ion sputtering, or electrophoresis, or spin coating, or Czochralski method, or screen printing, or inkjet printing, the composite nano insulating film layer having a high dielectric strength is attached to the metal film electrode to form a two-layer structure of the electrostatic energy storage unit, and then, the composite nano insulating film layer at one end of the metal film electrode is removed to expose a conductive surface, thus forming an anode/cathode.

D. Next, the third layer is prepared; a surface-modified nano ceramic nanocrystalline is hot-pressed into the ceramic nanocrystalline film; or a ceramic nanocrystalline precursor is prepared using sol-gel method, the ceramic nanocrystalline precursor is then drawn for film formation, and the film-drawn ceramic nanocrystalline precursor is fired into the ceramic nanocrystalline film, or the film-drawn ceramic nanocrystalline precursor is fired into the ceramic nanocrystalline film by means of laser scanning sintering, afterwards, by means of ion sputtering, or electrophoresis, or spin coating, or Czochralski method, or screen printing, or inkjet printing, the ceramic nanocrystalline film having an ultrahigh dielectric constant is further attached to the metal film electrode to form a three-layer structure of the electrostatic energy storage unit; and E. The fourth and fifth layers of the electrostatic energy storage unit are prepared by repeating the steps A to C and then laid on the three-layer structure formed in the step D, meanwhile, it shall be noted that the anode and cathode of the electrostatic energy storage unit should be located at the two ends, respectively, thus the electrostatic energy storage unit is completely prepared.

The step below may also be executed in case that a plurality of electrostatic energy storage units are piled up:

F. Nano metal conductive powders are overprinted on the anode and cathode of the electrostatic energy storage unit to form metal nano powder current collectors, the steps A to E are then repeated to pile up the electrostatic energy storage units in parallel until a set storage capacity or thickness is reached, and the piled-up electrostatic energy storage units are hot-pressed in a precision parallel-plate vacuum hot-pressing machine to finally form the electrostatic energy storage device.

The energy storage principle involved in the present invention is totally different from that of the lithium ion battery, and employs the plate electrostatic capacitor principle. The capacitance of a plate capacitor is in direct proportion to the area of a corresponding plate electrode, in inverse proportion to the spacing between plate electrodes and in direct proportion to the dielectric constant of a medium, and the capacitance formula of the plate capacitor is as follows: $C=S\epsilon\epsilon_0/d$, wherein C is the capacitance, S is the relative area, $\epsilon_0$ is the vacuum dielectric constant, $\epsilon$ is the dielectric constant of the medium, and d is the inter-plate electrode spacing.

In the plate capacitor unit involved in the present invention, nano ceramic powders having large dielectric constant and dielectric strength are used to form the nano film medium; the dielectric constant is $10^6$ orders of magnitude and the spacing between the metal film electrodes is on the micron scale, so the capacitance of the capacitor is improved remarkably. Simultaneously, by nano micro-processing on the metal film electrode, the metal film electrode is imparted with a nano-scale semi-porous microstructure or a nano hair structure, thus the specific surface area of the metal film electrode is improved remarkably and the capacitance of the plate capacitor is further improved. The energy storage formula of the plate capacitor is as follows: $E=1/2CV^2$, wherein E is the energy stored in the plate capacitor, C is the capacitance of the plate capacitor, and V is the voltage between capacitor electrodes.

Detailed description will be made below to a specific embodiment in which the foregoing preparation method of the present invention is adopted.

The first step: mirror stainless steel is used as a substrate, a layer of nickel metal film is prepared on the mirror stainless steel substrate by means of electrochemical deposition, deposition current and time are controlled, the deposition thickness of the nickel film is controlled to be 12 microns, the area of the nickel film is 10 cm*10 cm, thus the metal film electrode is formed;

The second step: photoetching is carried out, positive photoresist is coated on the two surfaces of the nickel film in a manner of spin coating, a photoresist dot pattern mask layer having a diameter of 1.2 microns is prepared using a mask exposure technique, the corrosion depths on the two surfaces are controlled by a chemical corrosion method so that a micro pit having a diameter of 1.25 microns and a depth of 3.6 microns is formed on each surface, a regular microstructure is formed on the surface of the nickel metal film, thereby imparting the film metal electrode with a large surface area;

The third step, insulating film sol that is needed in Czochralski method is prepared at first. Aluminum oxide nano particles having a particle size below 20 nanometers are ultrasonically dispersed in a DMF solvent (dimethylformanide solvent), the content of aluminum oxide is maintained at 15%, and 1-5% of polyimide is dissolved in the solvent and then fully stirred for 2 hours to generate the insulating film sol. The properly-prepared nickel metal film having the surface microstructure is dipped in the insulating film sol and slowly pulled, and with the volatilization of the solvent, an ultrathin insulating film layer is formed on the surface of the nickel metal film. The insulating film within an edge distance of about 5 mm from one edge of the surface is erased by the DMF solvent so as to form the anode/cathode of the metal film electrode, i.e. a conductive electrode region of the current collector.

The fourth step, ceramic nanocrystalline copper calcium titanate having a dielectric constant of $10^5$ orders of magnitude is used as the material of the ceramic nanocrystalline film, its particle size distribution is controlled to be within a range from 50 nm to 100 nm by means of centrifugal separation, the ceramic nanocrystalline copper calcium titanate is ultrasonically dispersed in ethanol water, the fluidity of the ethanol water is adjusted by ethylene glycol so that it has the same surface tension and fluidity as a piezoelectric inkjet printer, in this way, ceramic nanocrystalline inkjet printing ink having a high dielectric constant is prepared; using the method above, nano nickel particles having a particle size of 5-15 nm are used to prepare nano nickel ion-containing ink for inkjet printing, and this ink serves as the material of the metal nano powder current collector. The metal film electrode prepared in the third step is fixed on a plate having the function of constant-temperature heating, the temperature of the plate is maintained at 75° C., the piezoelectric plate inkjet printer is used to jet ceramic nano crystals on the metal film electrode, nano nickel ions are jet into the conductive electrode region, the thickness is controlled to be within a range from 10 microns to 20 microns, and the metal nano powder current collector is formed;

The fifth step, the surface of the ceramic nanocrystalline film in the fourth step is covered by the same metal film electrode, so that the conductive electrode region of this metal film electrode is opposite to and staggered with the conductive electrode region of the metal film electrode on the other side, finally forming the electrostatic energy storage unit (See FIG. 2);

The sixth step: the five steps above are repeated to achieve 2000 layers in the entire electrostatic energy storage device with a thickness of 30-60 nm, the electrostatic energy storage device is put in a precision hot pressing machine and heated to 950° C., and temperature and pressure are maintained for 2 hours under the pressure of 1 MPa to obtain the predesigned electrostatic energy storage device.

In the electrostatic energy storage device of the present invention, the metal film electrode having the nano microstructure is processed to form a nano film layer having a high dielectric strength on the surface of the metal film electrode, in order to improve the dielectric strength of the entire capacitor and realize the withstand voltage of the plate capacitor unit on a kilovolt grade. The device, due to its full-solid material structure, is capable of high-speed charging and discharging at a high current density, thereby shortening the charging time greatly and improving the discharging power density tremendously.

The specific embodiments above are for exemplary illustration of the structure of the present invention only, many modifications and changes could be made by those ordinary skilled in this art without departing from the concept of the present invention, and these modifications and changes shall be all included within the scope of the present invention.

What is claimed is:

1. An electrostatic energy storage device, comprising:
   at least one electrostatic energy storage unit configured to realize a withstand voltage on a kilovolt grade, and each of the at least one electrostatic energy storage unit comprises:
      two metal film electrodes which form a capacitor, wherein a spacing between the metal film electrodes is on a micron scale;
      composite nano insulating film layers attached to the inner sides of the two metal film electrodes; and
      a ceramic nanocrystalline film arranged between the composite nano insulating film layers, wherein the ceramic nanocrystalline film is formed by nano ceramic powders having a large dielectric constant and high dielectric strength, and the dielectric constant is in a $10^6$ order of magnitude.

2. The electrostatic energy storage device according to claim 1, characterized in that: the device comprises a plurality of electrostatic energy storage units, and the electrostatic energy storage units are connected with each other in parallel through a metal nano powder current collector, wherein the metal nano powder current collector comprises metal nano particles having a particle size of 5-15 nm.

3. The electrostatic energy storage device according to claim 1, characterized in that: the metal film electrode is made from one of the group consisting of nickel, copper, zinc, tin, silver and alloy thereof, preferably from nickel.

4. The electrostatic energy storage device according to claim 1, characterized in that: the metal film electrode has a thickness of 1.0-15 microns, preferably 2.5 microns.

5. The electrostatic energy storage device according to claim 1, characterized in that: the composite nano insulating film layer is made from an organic nano insulating material having a particle size less than 50 nanometers and a breakdown voltage of $10^6$-$10^7$V/cm orders of magnitude, or an inorganic nano insulating material, or an organic/inorganic hybrid nano insulating layer.

6. The electrostatic energy storage device according to claim 1, characterized in that: the composite nano insulating film layer has a thickness of 0.1-0.5 microns, preferably 0.25 microns.

7. The electrostatic energy storage device according to claim 1, characterized in that: the ceramic nanocrystalline film is made from a ferroelectric ceramic nanocrystalline material or a non-ferroelectric ceramic nanocrystalline material, preferably from the non-ferroelectric ceramic nanocrystalline material.

8. The electrostatic energy storage device according to claim 1, characterized in that: the ceramic nanocrystalline film has a thickness of 1-20 microns, preferably 6.5 microns.

* * * * *